(12) United States Patent
Honkanen et al.

(10) Patent No.: US 7,991,413 B2
(45) Date of Patent: *Aug. 2, 2011

(54) METHOD AND DEVICE FOR CONTROLLING RADIO ACCESS

(75) Inventors: Mauri Honkanen, Tampere (FI); Mika Kasslin, Espoo (FI); Pasi Katajainen, Tampere (FI); Niko Kiukkonen, Veikkola (FI)

(73) Assignee: Nokia Corporation, Keilalahdentie 4 Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/575,025

(22) Filed: Oct. 7, 2009

(65) Prior Publication Data

US 2010/0029215 A1 Feb. 4, 2010

Related U.S. Application Data

(63) Continuation of application No. 11/283,792, filed on Nov. 22, 2005, now Pat. No. 7,623,879.

(30) Foreign Application Priority Data

Nov. 11, 2004 (FI) ..................................... 20045450

(51) Int. Cl.
*H04Q 7/20* (2006.01)
(52) U.S. Cl. .................. 455/501; 455/550.1; 455/552.1; 455/500; 455/67.11; 370/310; 370/329; 370/328; 370/343
(58) Field of Classification Search .............. 455/550.1, 455/501, 552.1, 553.1, 500, 67.11, 422.1, 455/403, 426.1, 426.2, 435.1, 435.2, 455, 455/466, 515, 67.13, 68, 69, 517, 41.1, 41.2; 370/310, 329, 328, 343

See application file for complete search history.

(56) References Cited

U.S. PATENT DOCUMENTS

| | | | |
|---|---|---|---|
| 4,885,715 A | 12/1989 | McCanny et al. |
| 5,459,816 A | 10/1995 | Basehore et al. |
| 5,649,303 A | 7/1997 | Hess et al. |
| 6,006,106 A | 12/1999 | Cook et al. |
| 6,138,010 A | 10/2000 | Rabe et al. |
| 6,278,723 B1 | 8/2001 | Meihofer et al. |
| 6,741,639 B1 | 5/2004 | Yoshida et al. |
| 6,816,476 B2 | 11/2004 | Kim et al. |
| 6,836,506 B2 | 12/2004 | Anderson |
| 6,978,121 B1 | 12/2005 | Lane et al. |
| 7,373,156 B2 | 5/2008 | Ruutu et al. |
| 7,447,179 B2 | 11/2008 | Lu |

(Continued)

FOREIGN PATENT DOCUMENTS

CN 1429431 A 7/2003

(Continued)

OTHER PUBLICATIONS

Chinese Office Action for Application No. 2005800447917 issued on Dec. 4, 2009.

(Continued)

*Primary Examiner* — Keith T Ferguson
(74) *Attorney, Agent, or Firm* — Squire, Sanders & Dempsey (US) LLP (57) ABSTRACT

A method for controlling a number of simultaneous radio connections in a communication device is presented. The control of a number of simultaneous radio connections is carried out in the communication device. Parameters of the radio connections are controlled such that interference between the radio connections is minimized.

44 Claims, 3 Drawing Sheets

U.S. PATENT DOCUMENTS

| | | |
|---|---|---|
| 2001/0051530 A1 | 12/2001 | Shiotsu et al. |
| 2002/0012381 A1 | 1/2002 | Mattisson et al. |
| 2002/0098864 A1 | 7/2002 | Mukai et al. |
| 2002/0176524 A1 | 11/2002 | Popper et al. |
| 2003/0078037 A1 | 4/2003 | Auckland et al. |
| 2003/0125019 A1 | 7/2003 | Bajikar |
| 2003/0169827 A1 | 9/2003 | Shi et al. |
| 2003/0228892 A1 | 12/2003 | Maalismaa et al. |
| 2004/0018818 A1 | 1/2004 | Hottinen et al. |
| 2004/0023678 A1 | 2/2004 | Fredriksson |
| 2004/0042576 A1 | 3/2004 | Anderson |
| 2004/0185899 A1 | 9/2004 | Hayem et al. |
| 2004/0225461 A1 | 11/2004 | Floyd et al. |
| 2004/0243331 A1 | 12/2004 | Davis et al. |
| 2005/0020299 A1 | 1/2005 | Malone et al. |
| 2005/0095982 A1 | 5/2005 | Blanchard et al. |
| 2005/0131636 A1 | 6/2005 | Derambure et al. |
| 2005/0201355 A1 | 9/2005 | Saito |
| 2005/0239497 A1 | 10/2005 | Bahl et al. |
| 2006/0084469 A1 | 4/2006 | Malone et al. |
| 2006/0221926 A1 | 10/2006 | Maekawa et al. |
| 2006/0238418 A1 | 10/2006 | Monnerat et al. |
| 2007/0165594 A1 | 7/2007 | Heinle et al. |
| 2008/0112517 A1 | 5/2008 | Parts et al. |
| 2008/0267160 A1 | 10/2008 | Ibrahim et al. |
| 2008/0293445 A1 | 11/2008 | Piippponen et al. |

FOREIGN PATENT DOCUMENTS

| | | |
|---|---|---|
| EP | 0941002 A2 | 9/1996 |
| EP | 1122554 A1 | 8/2001 |
| EP | 1389855 A2 | 2/2004 |
| GB | 2399982 A | 9/2004 |
| GB | 2402843 A | 12/2004 |
| GB | 2407178 A | 4/2005 |
| JP | 2001-345756 A | 12/2001 |
| JP | 2002-319948 A | 10/2002 |
| JP | 2003-234745 A | 8/2003 |
| JP | 2004-032462 A | 1/2004 |
| JP | 2004-186781 A | 7/2004 |
| JP | 2004-363728 A | 12/2004 |
| JP | 2005-529549 A | 9/2005 |
| WO | 0106669 A1 | 1/2001 |
| WO | 01/89102 A1 | 11/2001 |
| WO | 03/105418 A2 | 12/2003 |
| WO | 2004/045082 A2 | 5/2004 |
| WO | 2004054120 A2 | 6/2004 |
| WO | 2006096864 A2 | 9/2006 |
| WO | 2007060494 A1 | 5/2007 |

OTHER PUBLICATIONS

European Search Report application No. 05812730.9 dated Feb. 17, 2010.

Japanese Office Action application No. 2007-542025 dated Apr. 19, 2010.

Korean Office Action application No. 10-2007-7013926 dated Jun. 23, 2010.

Jim Lansford, et al., "Wi-Fi (802.11b) and Bluetooth: Enabling Coexistence", IEEE Network, 0890-8044/01, Sep./ Oct. 2001.

METHOD AND DEVICE FOR CONTROLLING RADIO ACCESS

REFERENCE TO RELATED APPLICATIONS

This application is a continuation application of U.S. patent application Ser. No. 11/283,792 filed on Nov. 22, 2005, which claims priority of Finnish Patent Application No. 20045450 filed on Nov. 11, 2004 in Finland. The subject matter of these earlier filed applications is hereby incorporated by reference.

FIELD

The invention relates to controlling a number of simultaneous radio connections in a communication device.

BACKGROUND

The number of different radios in mobile communication devices is steadily increasing to facilitate more flexible connectivity and a broader range of services. Cellular access alone is no longer sufficient, but new wireless technologies are integrated to communication devices now and especially in the future to enable novel connectivity solutions. Integration of multiple radios into a single terminal, however, introduces a serious integration challenge that is becoming more pronounced as the number of radios increases. One element of the integration challenge is the appropriate handling of simultaneous operation of radios. It is quite evident that users are willing to use different radios at the same time, like using a headset employing wireless Bluetooth® technology during a GSM phone call, and using a wireless local area network (WLAN) connection for Internet surfing, for example.

If there are two or more operational radio connections from one communication device, the connections may very well interfere with one another. Even if the connections are not operating on the same frequency band, they may still interfere with each other due to the non-idealities in the components of the communication device. The components may introduce spectral leakage, and the selectivity of receivers may not be ideal, meaning that they may also receive signal components belonging to a signal other than the desired one.

If there is a number of connections simultaneously operating on the same band, interference they cause to one another is much more severe than if they were operating on separate bands. Especially on the 2.4 GHz unlicensed Industrial, Scientific and Medical (ISM) band there may be several connections, for example Bluetooth® and wireless local area network (WLAN) connections, operating on the same band simultaneously. These connections cause inter-system interference to one another, which may result in a degraded quality of service. If there are two active connections on the same band operating from the same communication device, these two connections may very well interfere with each other severely, or the connections may even block each other's usage totally. This may happen because both of the connections operate from the same communication device, and thus the radio transceivers may be located within a few centimeters from each other. They may also be using the same radio components, like an antenna, for instance.

BRIEF SUMMARY

An object of the invention is to provide a solution for controlling a number of simultaneous radio connections in a communication device.

According to an aspect of the invention, there is provided a method for creating a new radio connection in a communication device with at least one existing radio connection. The method comprises determining whether or not an existing radio connection and a new radio connection interfere with one another and creating the new radio connection with parameters that minimize interference between the existing radio connection and the new radio connection if the existing radio connection and the new radio connection interfere with one another.

According to another aspect of the invention, there is provided a method for controlling a number of simultaneously operating radio connections in a communication device. The method comprises monitoring properties of the radio connections in order to detect interference between at least two radio connections and adjusting parameters of at least one radio connection so that interference between the radio connections is minimized if interference between the at least two radio connections is detected.

According to another aspect of the invention, there is provided a communication device comprising at least one communication interface to provide at least one radio connection and a control unit which is configured to create at least one radio connection, process a request to create a new radio connection, determine whether or not an existing radio connection and the new radio connection interfere with one another and create the new radio connection with parameters that minimize interference between an existing radio connection and the new radio connection if the existing radio connection and the new radio connection interfere with one another.

According to another aspect of the invention, there is provided a communication device comprising at least one communication interface to provide a radio connection and a control unit configured to monitor properties of the radio connections in order to detect interference between at least two radio connections and adjust parameters of at least one radio connection so that the interference between the radio connections is minimized, if interference between the at least two radio connections is detected.

According to yet another aspect of the invention, there is provided a computer program product embodied on a computer readable medium, the computer program product encoding a computer program of instructions for executing a computer process for creating a new radio connection in a communication device with at least one existing radio connection. The process comprises determining whether or not the existing radio connection and the new radio connection interfere with one another and creating the new radio connection with parameters that minimize interference between the existing radio connection and the new radio connection if the existing radio connection and the new radio connection interfere with one another.

According to yet another aspect of the invention, there is provided a computer program distribution medium readable by a computer and encoding a computer program of instructions for executing a computer process for creating a new radio connection in a communication device with at least one existing radio connection. The process comprises determining whether or not the existing radio connection and the new radio connection interfere with one another and creating the new radio connection with parameters that minimize interference between the existing radio connection and the new radio connection if the existing radio connection and the new radio connection interfere with one another.

According to yet another aspect of the invention, there is provided a computer program product embodied on a computer readable medium, the computer program product encoding a computer program of instructions for executing a computer process for controlling a number of simultaneously operating radio connections in a communication device. The process comprises monitoring properties of the radio connections in order to detect interference between at least two radio connections and adjusting parameters of at least one radio connection so that the interference between the radio connections is minimized if interference between the at least two radio connections is detected.

According to yet another aspect of the invention, there is provided a computer program distribution medium readable by a computer and encoding a computer program of instructions for executing a computer process for controlling a number of simultaneously operating radio connections in a communication device. The process comprises monitoring properties of the radio connections in order to detect interference between at least two radio connections and adjusting parameters of at least one radio connection so that the interference between the radio connections is minimized if interference between the at least two radio connections is detected.

The invention provides several advantages. The invention enables simultaneous operation of several radio connections from one communication device, even though the connections used the same radio resources, such as a frequency band. The invention is also able to control different radio connections regardless of the radio access technologies.

BRIEF DESCRIPTION OF THE DRAWINGS

In the following, the invention will be described in greater detail with reference to the embodiments and the accompanying drawings, in which.

DETAILED DESCRIPTION

Next, a structure of a communication device employing a number of simultaneous radio connections will be described with reference to FIG. 1. The communication device 100 may be for example a personal communication device such as a mobile communication device, a computer, a laptop, or a PDA (Personal Digital Assistant). The communication device 100 may also be a combination of two electronic devices, such as a computer with a mobile communication device connected to the computer. An example of a combination of a PDA and a mobile communication device is the Nokia Communicator®.

The communication device 100 comprises a number of communication interfaces 110 to 114 to provide a wireless radio connection. The communication interfaces 110 to 114 may be configured to provide connections employing different radio access technologies. In our example, the communication interface 110 provides a communication link 116 with a GSM (Global System for Mobile Communications)-system through a serving GSM base transceiver station 122. The communication interface 114 provides a WLAN (Wireless Local Area Network) connection 118 with a serving WLAN access point 124.

A communication interface 112 provides another wireless connection 120, using Bluetooth®-technology, with a user interface component 106. The user interface component 106 may be for example a headset of a mobile telephone, comprising a microphone, a loudspeaker, and a communication interface for a Bluetooth® connection with the mobile telephone. The user interface component 106 may also be a keyboard or a mouse operating with a computer through a Bluetooth® link.

The communication interfaces 110 to 114 described above may be using partially the same components of the communication device 100 during the operation of radio connections 116 to 120. The communication interfaces 110 to 114 may be using for example the same antenna or antennas, radio frequency amplifier, and/or radio frequency filter. Each communication interface 110 to 114 may naturally have its own components or only some of the communication interfaces 110 to 114 may be using the same components.

Figure 1:
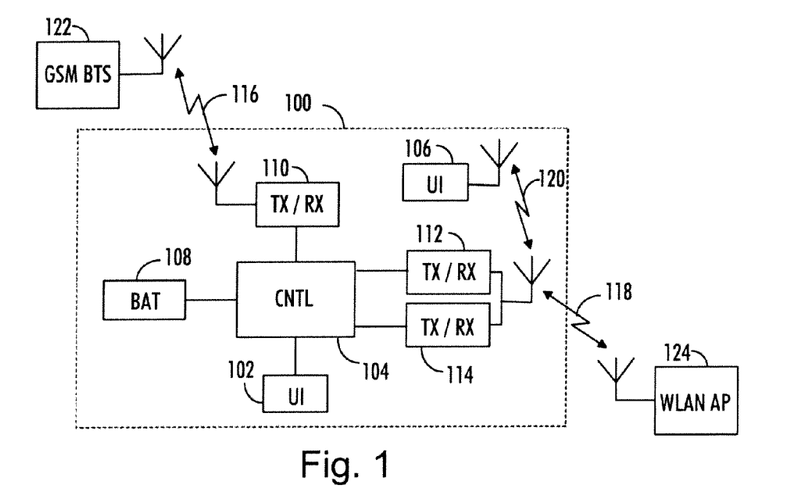
FIG. 1 shows a block diagram of a communication device employing a number of radio connections.

In the example of FIG. 1 three communication interfaces 110 to 114 are provided in the communication device, these interfaces 110 to 114 providing the Bluetooth® connection 122, the GSM connection 116, and the WLAN connection 118, respectively. It should, however, be appreciated that the communication device according to the invention is limited neither to the number of communication interfaces in the communication device nor to the wireless communication technology the communication interfaces provide. Thus, the communication device may comprise several communication interfaces providing connections based on, for example, the following technologies: GSM, WLAN, Bluetooth®, WCDMA (Wideband Code Division Multiple Access), GPRS (General Packet Radio Service), EDGE (Enhanced Data Rates for GSM Evolution), DVB-H (Digital Video Broadcasting for Handheld devices), UWB (Ultra Wideband), GPS (Global Positioning System), CDMA2000. Other wireless communication technologies are also possible to be implemented in the communication device according to the invention.

The communication device 100 further comprises a control unit 104 to control functions of the device 100. The control unit 104 comprises means for creating radio connections between the communication device 100 and other communication devices or networks. The control unit 104 also comprises means for controlling a number of simultaneous radio connections in the communication device 100. The control unit 104 may be implemented with a digital signal processor with suitable software or with separate logic circuits, for example with ASIC (Application Specific Integrated Circuit). The control unit 104 may also be a combination of these two implementations, such as a processor with suitable software embedded within an ASIC.

The communication device 100 further comprises a user interface 102 connected to the controlling unit. The user interface 102 may comprise a keyboard, a microphone, a loudspeaker, a display, and/or a camera.

The communication device 100 usually comprises a voltage source 108 to provide current for the operation of the device 100. The voltage source may be for example a rechargeable battery.

Figure 2:
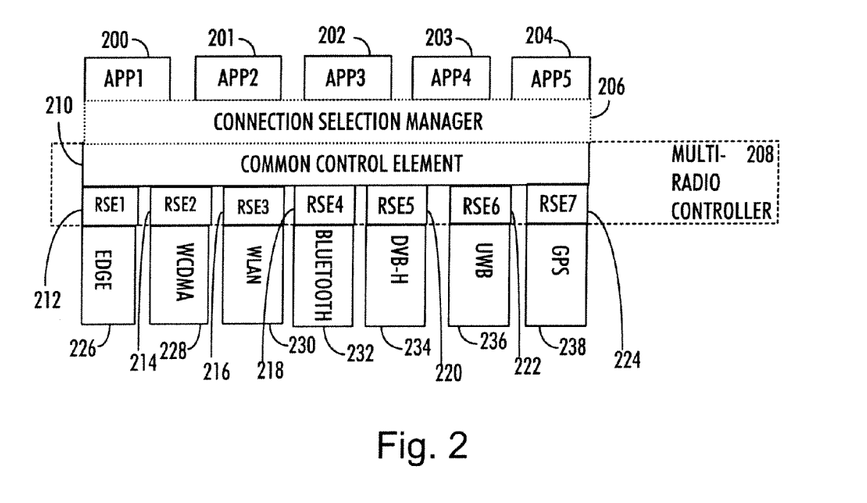
FIG. 2 illustrates an example of an architecture of a communication device.

FIG. 2 illustrates an example of an architecture of the communication device 100. The architecture is depicted in a layered form, like an OSI (Open Systems Interconnection) model of ISO (International Organization for Standardization), with lower layers providing services to higher layers.

On the highest layer are provided applications 200 to 204 that may need a radio connection. The application 200 to 204 may be for example an application handling a voice call, a web or WAP (Wireless Application Protocol) browser, an e-mail client, a GPS navigation application, a gaming application, or a media player application. The communication device 100 may also comprise other applications. Whenever an application 200 to 204 needs a radio connection to another communication device or network, the application sends a request to a lower layer to establish the connection. During the operation of the connection, the application sends data related to the application to lower layers for transmission over the connection to the other communication device. Similarly, the application receives data related to the application from the other communication device via the connection through the lower layers. When a need no longer exists to maintain the connection, the application sends a request to a lower layer to terminate the connection.

On the lower layer, services may be provided to the applications 200 to 204 by a connection selection manager 206. The connection selection manager 206 may select an appropriate connection for an application based on a set of connection profiles stored in its database. A user or an operator, for example, may define the connection profiles, and the profiles may be based on optimization of some criterion, for example throughput, bit error rate or cost-efficiency of the connection. The connection selection manager 206 is an optional layer in the architecture of the communication device 100, since the applications 200 to 204 may be designed to define the suitable connections by themselves.

The next lower layer is a multiradio controller 208. The multiradio controller 208 establishes, controls, and terminates radio connections according to the connection requirements from the higher layers. The multiradio controller 208 is also responsible for taking care of the simultaneous operation of multiple radio connections.

The multiradio controller 208 may be a two-fold entity. First of all, there is a common control element 210, which communicates with the higher layers. It receives requests for creating and terminating a radio connection from the applications 200 to 204 or, if applied, the connection selection manager 206. The common control element 210 may also check the availability of the radio connection requested from a higher layer, and either start a process for creating a radio connection or inform higher layers that the requested radio connection is not currently available. The common control element 210 is also responsible for controlling the simultaneous operation of multiple radio connections by adjusting the parameters of an existing connection whenever a new radio connection which would interfere with an existing radio connection is created, or whenever the common control element 210 detects a sufficient change in the properties of an existing connection.

The multiradio controller 208 also comprises radio-specific entities 212 to 224. Each radio-specific entity can be seen as an interface between the common control element 210 of the multiradio controller 208 and the specific radio interface. A radio-specific entity takes care of controlling one radio connection according to the parameters received from the common control element 210. A radio-specific entity is close to the physical layer of the connection, which enables rapid adaptation to the changing environment and fast control of the connection. The functionality of each radio-specific entity is radio-system-specific, which means that the parameters from the common control element 210 are applied to the standard specifications of the radio system. A radio-specific entity may also supply the common control element 210 with the measured properties of the connection it controls. The measured properties of the connection may comprise the bit error rate (BER), block error rate, or the frame error rate (FER) of the connection. The measured properties may also comprise received energy per chip divided by the noise power density in the band (Ec/No), interference signal code power (ISCP), received signal code power (RSCP), received signal strength indicator (RSSI), signal-to-interference-power ratio (SIR).

In an embodiment of the multiradio controller radio-specific entities are not included in the multiradio controller. Instead, the multiradio controller may have an interface to an external entity providing the interface to each radio.

Below the radio-specific entities 212 to 224 in FIG. 2 are provided the communication interfaces 226 to 238. Each communication interface takes care of encoding and decoding data into suitable electrical waveforms for transmission and reception on the specific physical media used. This process is carried out according to each radio-access-specific standard. The architecture of FIG. 2 employs physical layers of EDGE, WCDMA, WLAN, Bluetooth®, DVB-H, UWB and GPS radio access technologies, but the operation of the multiradio controller is not limited to these technologies as it can be configured to control also other wireless radio access technologies.

Figure 3:
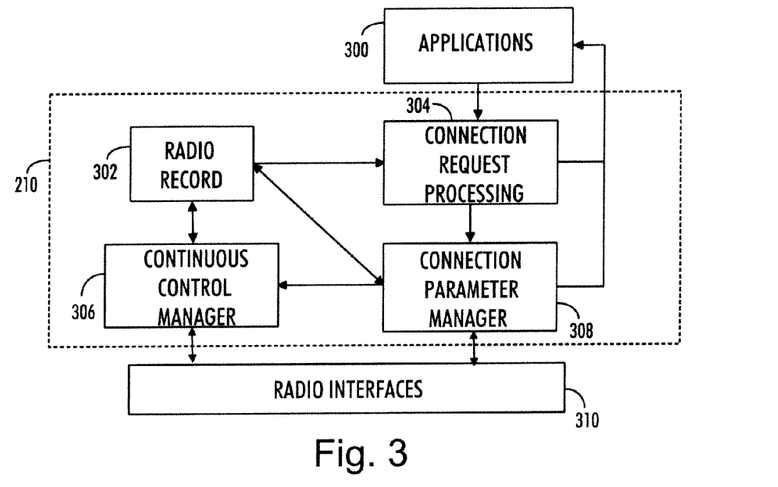
FIG. 3 illustrates an example of a structure of a multiradio controller.

Next, the operation of the multiradio controller 208 in the communication device will be described in more detail with reference to FIG. 3 comprising the structure of the common control element 210 of the multiradio controller 208. In addition to the common control element 210, FIG. 3 comprises applications 300 and radio interfaces 310 to clarify the operation of the common control element 210.

A block 300 comprises applications, which may need a radio connection. The operation of the applications 300 is the same as described above. The block 300 may also comprise a connection selection manager, if a connection selection manager is applied in the communication device.

A connection request processing block 304 processes requests for a radio connection coming from an application or from the connection selection manager. The connection request processing block 304 checks at least the validity of a request and the availability of radio resources related to the request. Checking the validity of a request comprises checking, whether or not the requested radio connection is available in the communication device. Checking the availability of the radio resources comprises checking which and how many radio connections are in operation, and whether it is possible to establish another radio connection without deteriorating or even collapsing the operation of an existing connection. If the requested connection is available and if it is possible to establish it, the connection request processing block 304 sends a command message to create the connection to a connection parameter manager 308. If the creation of the connection is not possible, the connection request processing block 304 informs the application, or the connection selection manager, that requested the connection that the requested connection is not currently available.

A radio record block 302 comprises information on the status, parameters and properties of the radio connections applied to the communication device. The status of a connection describes whether the connection is in operation, available, or disabled. When a connection is in operation, a communication link has been established using the communication interface related to that specific connection, and data is being transported through that link. When a connection is available, no communication link related to that specific connection has been established but radio resources are available for the establishment of the connection. When a connection is disabled, the connection is not available due to lack of radio resources, for example. There may also be two descriptions for the status of a radio connection. For example, if it is possible to establish a number of connections using a single communication interface, the status of the connection in the radio record block 302 may be both 'in operation' and 'available'.

The parameters of the connections that are held in the radio record block 302 may comprise the center frequency of the connection as well as a spreading code, channel code, modulation technique, power level, timing parameters, data rate, packet type, link type, automatic repeat request (ARQ) scheme etc. The properties of the connections that are held in the radio record block 302 may comprise the BER or FER of the connection as well as other measured or detected properties of the connection.

The radio record block 302 may also comprise information on all possible parameters specific to each radio access technology employed in the communication device and not just the ones that are currently being used. This information may comprise all the possible frequency bands, modulation and coding schemes, waveforms, etc. of each radio access technology. The radio record block 302 may also comprise information on the measured or detected non-idealities of the connections, such as spectral leakage or spurious emissions of radio signals. This information may then be used when controlling a number of simultaneously operating radio connections.

The radio record block 302 provides information on the status, parameters, and properties of the connections to the connection request processing block 304, to the connection parameter manager 308, and to the continuous control manager 306. The radio record block 302 receives updates to the status, parameters, and properties from the connection parameter manager and from the continuous control manager. The radio record block 302 is included in the common control element 210 of FIG. 2.

A connection parameter manager 308 determines the operational parameters of each connection. When receiving a command from the connection request processing block 304 to create a new connection, the connection parameter manager 308 checks which connections are operational, and the parameters of the operational connections. If the connection parameter manager 308 detects that there is an active connection which might interfere with the operation of the new connection (or vice versa), the connection parameter manager 308 defines the parameters of the new connection so that interference between the two connections is as minimal as possible.

The detection of possible interference between connections is based on the information on the used radio resources, available radio resources, and on the parameters of existing connections. This information is contained in the radio record block 302. The connection parameter manager 308 may first check, whether or not an existing, operational connection exists that uses the same radio resources as the newly requested connection would use. These radio resources comprise a frequency band, time domain, and space domain. The space domain is a possible radio resource in communication devices which comprise multiple antennas and an ability to control the direction of a radio beam from the antenna or antenna array. It is possible that two simultaneous radio connections are operating on the same frequency band and transmitting/receiving data at the same time, only in/from different directions.

If no radio connections using the same radio resources exist, the creation of a new connection is simple, since the connection parameter manager 308 does not have to arrange several connections to share the same radio resources. The connection parameter manager 308 simply defines the parameters for the connection and sends a command to the corresponding radio-specific entity to create the connection.

If an operational radio connection exists that uses the same radio resource(s) as the requested new connection, the connection parameter manager 308 may define the parameters for the new connection so that interference between the two connections is minimized. The connection parameter manager 308 may also adjust the parameters of the existing connection in order to minimize the interference between the two connections using the same radio resource(s).

Next, a number of examples of defining/adjusting the parameters of a radio connection in creation and/or the existing radio connection(s) will be described. The radio connection in creation may employ different radio access technology than an existing radio connection or radio connections use. Equivalently, the radio connection in creation may employ the same radio access technology than an existing radio connection or radio connections use. It should be appreciated that the operation of the connection parameter manager 308 and the multiradio controller 208 is not limited to the examples described below, but other procedures for defining/adjusting the parameters of the radio connections are also possible.

When creating a new radio connection, the connection parameter manager 308 may first check, whether existing connections exist that use the same frequency band as the requested new connection in creation would use. If an existing connection on the same frequency band exists, the connection manager may (if possible) define the frequency parameters of the connection in creation so that the frequency bands of two connections do not overlap. For example, a Bluetooth® connection and a WLAN connection operate partially on the same 2.4 Gigahertz ISM-band. Let us assume that the connection in creation is a Bluetooth® connection, and a WLAN connection in operation exists. The Bluetooth® connection is a frequency hopping spread spectrum connection. Thus, the connection parameter manager 308 may prevent the Bluetooth® connection from hopping to the frequencies the WLAN connection is using. The limitation of frequency hops of the Bluetooth® connection is naturally possible also when a Bluetooth® connection exists and the connection in creation is a WLAN connection. The frequency overlapping is naturally also possible between connections other than just Bluetooth® and WLAN ones, and the frequency parameters of these other connections may be adjusted accordingly.

In some cases the frequency bands of two connections may overlap too much to enable the connections to be enabled to operate on the same frequency band. If the connection parameter manager 308 detects that a new connection cannot be created without using the same band as that used by an existing connection, the connection parameter manager 308 may next check whether it is possible to schedule the two connections so that the connection will not be transporting data at the same time. If applicable, the scheduling of two connections may be carried out by the multiradio controller 208 in the communication device. In many communication systems, however, very strictly defined time slots exist for data transport allocated for a connection. In such a case the connection parameter manager 308 may delay the establishment of a new connection so that the time slots allocated for the connections using the same band do not overlap.

It is also possible in some communication systems for the communication device to control the transmission or reception timing, either directly or indirectly. For example, in a GPS system a GPS receiver may decide the timing of reception. In packet switched systems, a receiver may choose not to receive packet switched data when another connection is using the same radio resource. If the receiver misses the reception of a transmitted data packet during that time, the transmitter does not receive a 'packet received' indication from the receiver, and retransmits the packet. This is a standard feature in most packet switched systems.

Space as a radio resource can be divided between connections in the same way as the frequency band and time described above. If a connection exists that uses the same frequency band, and/or the allocated time slots are all in use, but there is no connection transporting data to the same direction as in which the connection in creation would be transporting, the new connection may be established to transport data on the same frequency band in the same time slots, only in a different direction. This, however, requires an ability to control the direction of the connections from the communication device. The communication device should also comprise multiple directional antennas or an antenna array.

In some cases no alternative exists for two connections (an existing connection and the connection in creation) but to use at least partly but even totally the same radio resources. In this case, the connection parameter manager 308 may determine, whether the new connection may be allocated with at least partly the same radio resources as the existing connection with a tolerable level of interference between the new connection and the existing connection. The tolerable level of interference between the connections may be such interference level that the connections do not block each other even though the effective data rate of the connections would be reduced. The connection parameter manager 308 may check the radio record 302 for knowledge of which radio connections may share at least partly the same radio resources and check the parameters of the connections for such case. The two connections then interfere with one another and, in the worst case, may block each other's operation totally. In such a case, other parameters of the connections could be adjusted so that the connections would tolerate as much interference as possible. Such parameters include modulation, coding (spreading code and/or channel code), interleaving, transmission power, and data rate. Other parameters of the connection may also be adjusted. An existing radio connection may even be put on a standby state or even terminated in order to create a new connection if the new connection has a higher priority than the existing connection, and it is not possible for the two connections to operate simultaneously. An alternative is that the creation of the new connection is terminated. In such a case, the connection parameter manager 308 informs the application/connection manager which requested the creation of the connection that the requested connection is currently unavailable.

After the connection parameter manager 308 has decided the proper parameters for the connection in creation, and possibly the adjustable parameters for an existing connection, it sends command messages to respective radio-specific entities to create a connection with the defined parameters, or to adjust the parameters of an existing connection. It updates the status and stores the parameters of the new connection in the radio record 302. The connection parameter manager 308 also sends the parameter of the new connection as well as a command to the continuous control manager 306 to start the monitoring and control of the new connection. Functions of the continuous control manager 306 will be described below.

Above, the functionality of the connection parameter manager 308 was described in the scenario where one connection is in creation and parameters of one existing connection are checked and possibly adjusted. The procedure is similar in a case where several connections exist, whose parameters need to be checked and/or adjusted in order to create a new connection. The operation of the connection parameter manager 308 is not restricted to the number of existing connections.

The continuous control manager 306 monitors the properties of operational radio connections, and adjusts their parameters according to the performance of the connections or to the information on the connections. The function of the continuous control manager 306 is to rapidly adapt the operating radio connections to the possibly changing radio environment. When a new connection is created, the continuous control manager 306 receives the parameters related to the connection and a command to start the monitoring and control of the new connection from the connection parameter manager 308. The continuous control manager 306 then starts monitoring the properties of the connection. The properties of the connection may be measured in the communication device or by the serving network system and delivered to the continuous control manager 306 through the corresponding radio-specific entity.

The continuous control manager 306 may monitor for example performance measures of operational connections. Such performance measures may be BER or FER. If the continuous control manager 306 detects too poor performance measures related to a connection, it may check whether the poor performance is associated with the use of a certain radio resource. For example when related to a Bluetooth® connection, a momentarily high bit error rate may be associated with a certain frequency hop. This may occur when an operational WLAN connection exists partially on the same band as a Bluetooth® connection, and the frequency hops to the band where WLAN is operating may produce poorer performance. If the poor performance is related to a use of a certain radio resource (or a portion of the radio resource), the continuous control manager 306 may adjust the parameters of a connection or connections so that the radio resource is not used by several connections. For instance, the parameters of a Bluetooth® connection may be adjusted so that the frequency hopping of the connection is limited to a narrower band, where no other operating connection exists. Controlling the use of time (or space) domain radio resources is carried out in a similar way, of course taking into account restrictions given by for example the radio systems (such as the time slots allocated for each connection in a GSM system).

If no alternative exists but to use the same radio resources for two (or more) connections, the continuous control manager 306 may adjust the parameters of one or more connections whose performance is too poor. The adjusted parameters may comprise a spreading code, channel code, modulation technique, power level, and/or timing parameters. If the performance of a connection or connections is still unsatisfactory, the continuous control manager 306 may temporarily shut down a connection or even terminate either the connection performing poorly or the connection interfering with the poorly performing connection.

The continuous control manager 306 may also have a pre-information on the possible combinations of connections, which may interfere with one another. For example, if the continuous control manager detects a poor performance in a Bluetooth® connection, it may automatically check, whether an operational WLAN connection (or vice versa) exists, because it has information that these connections may interfere with one another. If the continuous control manager 306 detects an operational WLAN connection, it may adjust the parameters of one or both connections. The continuous control manager 306 may take care of scheduling the transmission of packets, and changing parameters of packets to be transmitted. Possible parameters that may be changed comprise packet length, amount of data in the packet, modulation scheme, channel coding scheme, transmission frequency/rate of packets, and/or format of the packet (preamble, header, payload, etc.). The continuous control manager 306 may predict possible collisions of data packets of a number of connections and adapt the scheduling accordingly. Thus, the continuous control manager 306 may have information on the possible coincidences between connections, and also a defined set of rules as to how to rapidly adapt to these situations.

Figure 4:
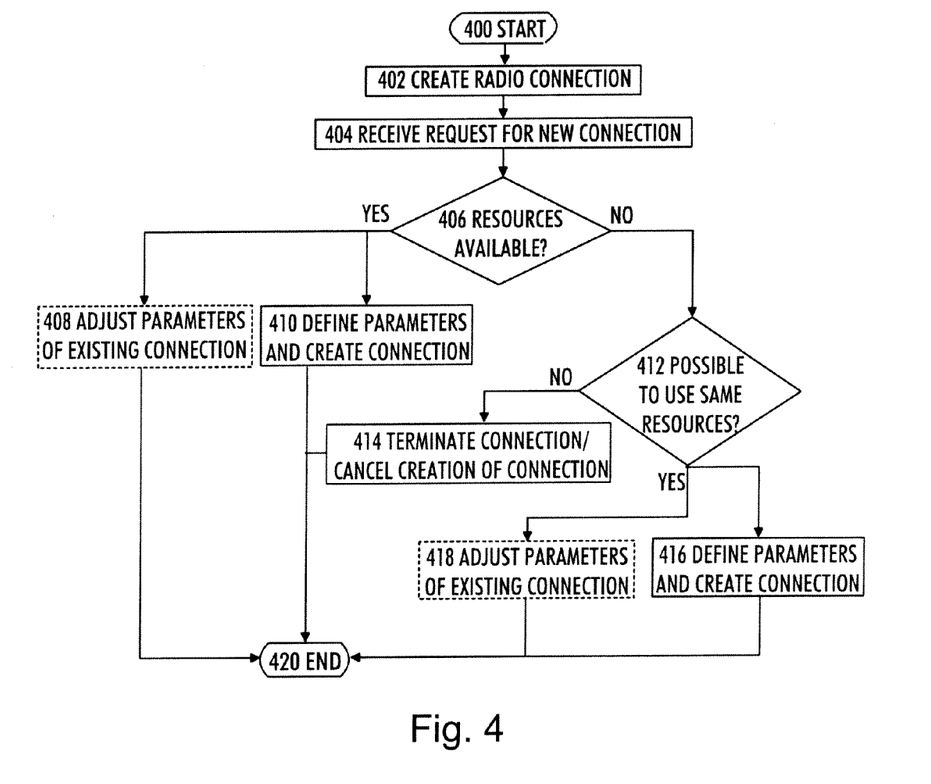
FIG. 4 is a flow diagram illustrating a process of creating a new connection in a communication device while operational connections exist.

FIG. 4 illustrates a method for creating a radio connection in a communication device, and arranging simultaneous operation of several radio connections. The process starts in 400 with no operational connections in the communication device. In 402 a first radio connection is created according to a prior art procedure. A request to create a new radio connection is received in 404. The request may come from an application in the communication device or from an external instance, for example from a radio network.

Available radio resources are checked in 406. This comprises checking the radio resources specified for the connection in creation. Available radio resources mean that there is at least a portion of one radio resource (frequency band, time slots, space) available. Although the frequency band the new connection is specified to use were in use, it may be possible to arrange the two (or more) connections to operate so that they do not transport data at the same time (or in the same direction).

If radio resources are available so that a new connection can be created without using the same radio resources as used for an existing connection, the process proceeds to 408 (optional) and 410. 408 is carried out, if the parameters of an existing radio connection have to be adjusted in order to create a new connection without the connections interfering with each other. A new connection with parameters that do not interfere with another connection is created in 410.

If no radio resources are available in 406, the process moves to 412, where it is checked whether or not it is possible to create another connection using at least partially all the same radio resources as used for an existing connection or connections. This means that at least two connections would be operating at least partially at the same frequency, transporting data at least partially at the same time and at least partially in the same direction.

If it is impossible to create another connection (even with adjusting the parameters of existing connection or connections) without blocking the usage of another radio connection, the process moves to 414, where one radio connection is either put on a standby state or even terminated. The radio connection put on a standby state or terminated may be an existing connection, but also the creation procedure of the new radio connection may be cancelled.

If it is possible in 412 to create another connection using the same radio resources as used for an existing connection or connections, the process proceeds to 416 and 418 (optional). The new connection with parameters that allow the connection to sustain interference to some degree is created in 416. The parameters of an existing connection or connections are adjusted accordingly, when necessary.

The process ends in 420.

Figure 5:
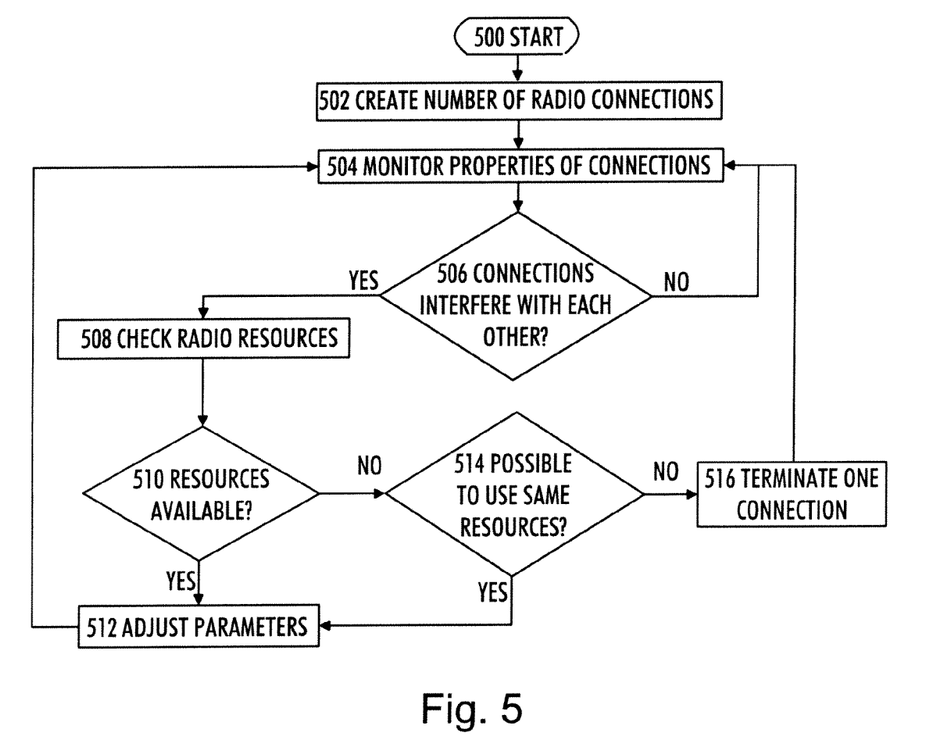
FIG. 5 is a flow diagram illustrating a process of controlling a number of simultaneous connections in a communication device.

FIG. 5 illustrates a procedure for controlling a number of simultaneous radio connections in a communication device. The process starts in 500. A number of radio connections is created according to the procedure of FIG. 4 in 502. Properties of the radio connections are monitored in 504. The properties being monitored may comprise properties describing the performance of the connection, such as BER or FER. It is checked in 506 whether two connections interfere with each other. Detection of two connections interfering with each other may be based on sudden degradation in performance of at least one connection combined to the information that there is another connection or connections using the same radio resources.

If two connections do not interfere with each other in 506, the process returns to 504 and continues the monitoring of the properties of the connections. If two connections are detected to interfere with each other in 506, the process moves to 508, where the radio resources are checked. This comprises checking the radio resources of both connections that interfere with each other. If there are radio resources available so that the two connections can operate without interfering with each other, the process moves from 510 to 512, where the parameters of at least one connection are adjusted so that the two connections do not interfere with one another. Adjusting the parameters of one connection may suffice in some cases, but a need may exist to adjust the parameters of both connections interfering with each other. Parameters of another connection or other connections that were not involved in the interference in 506 may also need to be adjusted in some cases. This may be the case in situations where the adjustment of parameters of one connection results in interference between the adjusted connection and another connection. A precaution would be to also adjust the parameters of that other connection at the same time so that interference between these two connections would be avoided.

The process returns from 512 to 504, and the monitoring of the properties of the operational radio connections in the communication device is continued.

If no other option exists for the two connections but to use the same radio resources, the process moves from 510 to 514, where it is checked whether or not it is possible for the two connections to operate using at least partially all the same radio resources. This means that at least two connections would be operating at least partially at the same frequency, transporting data at least partially at the same time and at least partially in the same direction.

If it is possible for the two connections to operate using the same radio resources in 514, the process proceeds to 512, where the parameters of one connection or both connections are adjusted so that they sustain interference to some degree, thus enabling the operation of two connections using the same radio resources. The process returns from 512 to 504, and the monitoring of the properties of the operational radio connections in the communication device is continued.

If it is impossible for the two connections to operate using the same radio resources in 514, the process moves to 516, and one of the connections is either put on a standby state or even terminated. A decision about which connection is put on a standby state or terminated is based on some criterion, such as priority or performance of the connections. A connection with a lower priority or poorer performance is terminated. The process returns from 516 to 504, and the monitoring of the properties of the operational radio connections in the communication device is continued.

The communication device 100 of the type described above may be used for implementing the methods, but also other types of communication devices may be suitable for the implementation. In an embodiment, a computer program product encodes a computer program of instructions for executing a computer process of the above-described method for creating a new radio connection in a communication device with at least one existing radio connection. In another embodiment, a computer program product encodes a computer program of instructions for controlling a number of simultaneously operating radio connections in a communication device. The computer program product may be implemented on a computer program distribution medium. The computer program distribution medium includes all manners known in the art for distributing software, such as a computer readable medium, a program storage medium, a record medium, a computer readable memory, a computer readable software distribution package, a computer readable signal, a computer readable telecommunication signal, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:
  determining an interference between radio parameters of an existing radio connection and radio parameters of a new radio connection created,
    wherein the radio parameters comprise at least one of frequency, time, and space domain parameters, and
    wherein the existing radio connection utilizes a radio access technology different from a radio access technology of the new radio connection;
  adjusting at least one of frequency and space domain radio parameters of the existing radio connection so as to reduce interference between the at least one existing radio connection and the new radio connection; and
  initiating establishment of the new radio connection after the adjustment.

2. The method of claim 1, wherein the adjustment further comprises releasing radio parameters of the at least one existing radio connection for the new radio connection to use.

3. The method of claim 1, further comprising:
  defining the parameters of the new connection such that the new radio connection does not use the same radio resources as the existing radio connection.

4. The method of claim 3, wherein the parameters of the new connection are defined such that the new radio connection does not transmit or receive data at a same time as the existing radio connection.

5. The method of claim 3, wherein the parameters of the new connection are defined such that the new radio connection does not transmit or receive data at a same frequency band as the existing radio connection.

6. The method of claim 1, further comprising:
  determining, whether the new connection may be allocated with at least partly the same radio resources as the existing connection with a tolerable level of interference between the new connection and the existing connection;
  defining the parameters of the new connection such that the new radio connection uses at least partly the same radio resources as the existing radio connection, when it has been determined that the new connection and the existing connection may be allocated with at least partly the same radio resources.

7. The method of claim 1, wherein the existing radio connection and the new radio connection employ the same radio access technology.

8. The method of claim 1, further comprising:
  adjusting the parameters of the existing radio connection in order to minimize interference between the new radio connection and the existing radio connection.

9. The method of claim 1, wherein the determining of whether or not the existing radio connection and the new radio connection interfere with one another is based on pre-information on properties of the existing radio connection and the new radio connection.

10. The method of claim 1, wherein the determining of whether or not the existing radio connection and the new radio connection interfere with one another is based on detected or measured properties of the existing radio connection.

11. A method, comprising:
  detecting interference between two simultaneous operating radio connections in a communication device;
  comparing transmission timings of one other radio connection to determine whether a poor performance in at least one of the two radio connections is due to simultaneous transmission; and
  adjusting at least one parameter of at least one radio connection of the two radio connections so that interference between the at least two radio connections is reduced when interference is determined due to the simultaneous transmission.

12. The method of claim 11, further comprising:
  monitoring properties describing a performance of the radio connections in order to detect interference between the at least two radio connections.

13. The method of claim 11, further comprising:
  adjusting the at least one parameter of the at least one radio connection such that the two radio connections do not use the same radio resources.

14. The method of claim 11, further comprising:
  adjusting parameters of the at least one radio connection such that the two radio connections interfering with one another use at least partially the same radio resources, when not enough radio resources are available for the two radio connections.

15. The method of claim 14, further comprising:
  adjusting the parameters of the radio connections that use at least partially the same radio resources in order for the radio connections to sustain interference.

16. The method of claim 11, further comprising:
  terminating or putting on a stand-by state the at least one radio connection when the two radio connections cannot be arranged to operate simultaneously.

17. An apparatus, comprising:
  a processor; and
  a memory including computer program code,
  the memory and the computer program code configured to, with the processor, cause the apparatus at least to create at least one radio connection as an existing radio connection,
  process a request to create a new radio connection,
  determine whether or not the existing radio connection utilizing a first radio access technology and the new radio connection being created and utilizing a second radio access technology interfere with one another on the basis of comparison of radio parameters of the existing radio connection and the new radio connection, wherein the radio parameters relate to at least one of frequency, time, and space domain parameters,
  adjust at least one of frequency domain and space domain radio parameters of the existing radio connection so as to reduce interference between the existing radio connection and the new radio connection, when it has been determined that the creation of the new radio connection will cause too high interference between the radio connections, and establish the new radio connection after the adjustment of the at least one radio parameter of the existing radio connection.

18. The apparatus of claim 17, wherein the memory and the computer program code further configured to, with the processor, cause the apparatus at least to carry out the adjustment by releasing radio parameters of the at least one existing radio connection for the new radio connection to use.

19. The apparatus of claim 17, wherein the memory and the computer program code further configured to, with the processor, cause the apparatus at least to define the parameters of the new radio connection such that the new radio connection does not use the same radio resources as the existing radio connection.

20. The apparatus of claim 19, wherein the memory and the computer program code further configured to, with the processor, cause the apparatus at least to define the parameters of the new radio connection such that the new radio connection is not transmitting or receiving data at a same time as the existing radio connection.

21. The apparatus of claim 19, wherein the memory and the computer program code further configured to, with the processor, cause the apparatus at least to define the parameters of the new radio connection such that the new radio connection does not transmit or receive data at a same frequency band as the existing radio connection.

22. The apparatus of claim 17, wherein the memory and the computer program code further configured to, with the processor, cause the apparatus at least to determine, whether the new connection may be allocated with at least partly the same radio resources as the existing connection with a tolerable level of interference between the new connection and the existing connection, and to define the parameters of the new connection such that the new radio connection uses at least partly the same radio resources as the existing radio connection, when it has been determined that the new connection and the existing connection may be allocated with at least partly the same radio resources.

23. The apparatus of claim 17, wherein the memory and the computer program code further configured to, with the processor, cause the apparatus at least to create radio connections which employ the same radio access technology.

24. The apparatus of claim 17, wherein the memory and the computer program code further configured to, with the processor, cause the apparatus at least to adjust the parameters of the existing radio connection in order to minimize interference between the new radio connection and the existing radio connection.

25. The apparatus of claim 17, wherein the memory and the computer program code further configured to, with the processor, cause the apparatus at least to determine, whether or not the existing radio connection and the new radio connection interfere with one another, based on pre-information on properties of the existing radio connection and the new radio connection.

26. The apparatus of claim 17, wherein the memory and the computer program code further configured to, with the processor, cause the apparatus at least to determine, whether or not the existing radio connection and the new radio connection interfere with one another, based on detected or measured properties of the existing radio connection.

27. The apparatus of claim 17, wherein the memory and the computer program code further configured to, with the processor, cause the communication device at least to assign the same frequency and time resources to the new radio connection and the existing radio connection when it is determined that utilization of the same frequency and time resources results in tolerable level of interference between the existing radio connection and the new radio connection.

28. The apparatus of claim 17, wherein the apparatus is a communication device.

29. The apparatus of claim 17, wherein the apparatus is a mobile communication device.

30. An apparatus, comprising:
a processor; and
a memory including computer program code,
the memory and the computer program code configured to, with the processor, cause the apparatus at least to
monitor properties of the radio connections in order to detect interference between at least two radio connections, wherein the radio connections operate simultaneously,
compare, upon detection of poor performance in at least one of the at least two radio connections, transmission timings of at least one other radio connection in order to determine whether or not the poor performance in the at least one of the at least two radio connections is linked to simultaneous transmission, and
adjust at least one parameter of at least one radio connection so that the interference between the at least two radio connections is reduced, when interference linked to the simultaneous transmission between the at least two radio connections is determined to exist.

31. The apparatus of claim 30, wherein the memory and the computer program code further configured to, with the processor, cause the apparatus at least to monitor properties describing a performance of the radio connections in order to detect interference between the at least two radio connections.

32. The apparatus of claim 30, wherein the memory and the computer program code further configured to, with the processor, cause the apparatus at least to adjust the at least one parameter of at least one radio connection of the at least two radio connections in a way that the at least two radio connections do not use the same radio resources.

33. The apparatus of claim 30, wherein the memory and the computer program code further configured to, with the processor, cause the apparatus at least to adjust parameters of at least one radio connection of the at least two radio connections such that the at least two radio connections interfering with one another use at least partially the same radio resources, when there are not enough radio resources available for the at least two radio connections.

34. The apparatus of claim 33, wherein the memory and the computer program code further configured to, with the processor, cause the apparatus at least to adjust the parameters of the at least two radio connections using at least partially the same radio resources in order for the at least two radio connections to sustain interference.

35. The apparatus of claim 30, wherein the memory and the computer program code further configured to, with the processor, cause the apparatus at least to terminate or put on a stand-by state at least one radio connection of the at least two radio connections when the at least two radio connections interfering with one another cannot be arranged to operate simultaneously.

36. The apparatus of claim 30, wherein the memory and the computer program code further configured to, with the processor, cause the communication device at least to assign the same frequency and time resources to the two radio connections when it is determined that utilization of the same frequency and time resources results in tolerable level of interference between the radio connections.

37. The apparatus of claim 30, wherein the apparatus is a communication device.

38. The apparatus of claim 30, wherein the apparatus is a mobile communication device.

39. An apparatus, comprising:
  determining means for determining an interference between radio parameters of an existing radio connection and the radio parameters of a new radio connection created,
    wherein the radio parameters comprise at least one of frequency, time, and space domain parameters, and
    wherein the existing radio connection utilizes a radio access technology different from a radio access technology of the new radio connection;
  adjusting means for initiating an adjustment of at least one of frequency domain and space domain radio parameters of the existing radio connection so as to reduce interference between the existing radio connection and the new radio connection; and
  initiating means for initiating establishment of the new radio connection after the adjustment.

40. An apparatus, comprising:
  communication means to provide at least two radio connections;
  monitoring means for monitoring properties of the radio connections in order to detect interference between at least two radio connections, wherein the radio connections operate simultaneously; comparing means for comparing, upon detection of poor performance in at least one of the at least two radio connections, transmission timings of at least one other radio connection in order to determine whether or not the poor performance in the at least two radio connections is linked to simultaneous transmission; and
  adjusting means for causing adjusting of at least one parameter of at least one radio connection of the at least two radio connections so that the interference between the at least two radio connections is reduced, when interference linked to the simultaneous transmission between the at least two radio connections is determined to exist.

41. A computer program distribution medium readable by a computer and encoding a computer program of instructions for executing a computer process, comprising:
  determining an interference between radio parameters of an existing radio connection and radio parameters of a new radio connection created,
    wherein the radio parameters comprise at least one of frequency, time, and space domain parameters, and
    wherein the existing radio connection utilizes a radio access technology different from a radio access technology of the new radio connection;
  adjusting at least one of frequency and space domain radio parameters of the existing radio connection so as to reduce interference between the at least one existing radio connection and the new radio connection; and
  initiating establishment of the new radio connection after the adjustment.

42. The computer program distribution medium of claim 41, the distribution medium comprising at least one of a computer readable medium, a program storage medium, a record medium, a computer readable memory, a computer readable software distribution package, a computer readable signal, a computer readable telecommunications signal, and a computer readable compressed software package.

43. A computer program distribution medium readable by a computer and encoding a computer program of instructions for executing a computer process, comprising:
  detecting interference between two simultaneous operating radio connections in a communication device;
  comparing transmission timings of one other radio connection to determine whether a poor performance in at least one of the two radio connections is due to simultaneous transmission; and
  adjusting at least one parameter of at least one radio connection of the two radio connections so that interference between the at least two radio connections is reduced when interference is determined due to the simultaneous transmission.

44. The computer program distribution medium of claim 43, the distribution medium comprising at least one of a computer readable medium, a program storage medium, a record medium, a computer readable memory, a computer readable software distribution package, a computer readable signal, a computer readable telecommunications signal, and a computer readable compressed software package.

* * * * *